United States Patent [19]

Lewis et al.

[11] Patent Number: 4,648,033

[45] Date of Patent: Mar. 3, 1987

[54] LOOK-ASIDE BUFFER LRU MARKER CONTROLLER

[75] Inventors: David O. Lewis; Lynn A. McMahon; Terry L. Schardt, all of Rochester, Minn.

[73] Assignee: International Business Machines Corporation, Armonk, N.Y.

[21] Appl. No.: 648,905

[22] Filed: Sep. 7, 1984

[51] Int. Cl.[4] .................... G06F 9/36; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,059,850 | 11/1977 | Van Eck et al. | 364/200 |
| 4,170,039 | 10/1979 | Beacom et al. | 364/200 |
| 4,322,795 | 3/1982 | Lange | 364/200 |
| 4,332,010 | 5/1982 | Messina et al. | 364/200 |
| 4,400,774 | 8/1983 | Toy | 364/200 |
| 4,437,155 | 3/1984 | Sawyer | 364/200 |
| 4,464,712 | 8/1984 | Fletcher | 364/200 |

Primary Examiner—David Y. Eng
Attorney, Agent, or Firm—Bradley A. Forrest

[57] ABSTRACT

A look-aside buffer in a computer system has a memory containing at least a first type of data and a second type of data stored in a page format. The look-aside buffer is arranged to retain at least two different real addresses as resolved by the system which indicate pages containing the different types of data. One of the addresses is indicated as least recently used by a marker and such address is deleted when a further different address is resolved by the system unless the address being resolved is an address corresponding to the first type of data. In such a case, the marker is not changed such that the second type of data addresses are not deleted from the look-aside buffer as a result of resolution of a first type data page address by the system.

15 Claims, 6 Drawing Figures

LOOK-ASIDE BUFFER LRU MARKER CONTROLLER

BACKGROUND OF THE INVENTION

The present invention relates to look-aside buffers used with computer main storage devices and more particularly to prioritizing addresses contained in such look-aside buffers as a function of the type of data identified by such addresses.

Look-aside buffers are used with large main storage devices to identify addresses of pages of memory such that the addresses are available without a requirement for significant processing to determine the address each time a page is referenced. A page of memory has a higher order address associated with it which is stored in a particular location in the look-aside buffer. Several pages correspond to a location which may have space for a limited number of the pages' addresses, such as two. Various schemes have been devised to optimize which two or more addresses are to be retained in the look-aside buffer. Such schemes usually utilize a least recently used criterion for retaining addresses.

U.S. Pat. No. 4,059,850 to Van Eck et al describes a memory system which includes a least recently used criterion for assigning priority to word groups. The priority of word groups is adjustable in that an invalid word group is assigned the lowest priority. In U.S. Pat. No. 4,437,155 to Sawyer et al a cache store for storing segments and deleting older segments is described wherein segments which are most likely to be accessed soon are read in addition to the segment specified by a command. The likely to be accessed segments are given a priority below the segment specified by the command. U.S. Pat. No. 4,322,795 to Lange et al relates to a main memory shared by two processors wherein sections of a cache are indicated as empty when one of the processors has changed corresponding data in the main memory.

When different types of data are located within a main storage device and a look-aside buffer or cache is employed to reduce access time, one type of data can replace data of another type in the buffer and cause the replaced data to be determined again.

In the case of a computer which executes instructions which require 2 or more data operands which may be on different pages of memory, and performs prefetch of a subsequent instruction specified by the current instruction, the subsequent instruction's address is inserted in a buffer with an address of one of the required data operands. Resolution of a further required operand address then results in the other required operand address being removed from the buffer. The current instruction is then restarted, one of the operand addresses resolved, the subsequent instruction address resolved, and then the next operand address resolved, causing the other operand address to be removed and a restart of the current instruction. This results in an infinite loop which was previously handled by delay of access of subsequent instructions and check-pointing the current instruction to permit it to be resumed rather than restarted. This required more instructions and resulted in reduced performance due to the additional time spent waiting for the subsequent instruction and extra check-point processing.

SUMMARY OF THE INVENTION

A look-aside buffer contains real addresses of pages in a memory of a computer system, the memory being arranged in a page format. The memory stores at least a first and a second type of data. The look-aside buffer contains at least two different real addresses of such pages per buffer location. One of the real addresses, which are resolved by the computer system, is indicated as least recently used by a marker and therefore is deleted when a further different real address is resolved from a virtual address. A data type detection means detects address resolutions by the system which occur corresponding to the first type of data. When a resolution of an address of the first type of data occurs, the least recently used marker is prevented from indicating that the address corresponding to a second type of data is least recently used.

The look-aside buffer provides a means of translating a 6-byte virtual address to a real address by looking for the translation in the look-aside buffer before a microcode routine is used to translate to a real address. The look-aside buffer is arranged such that each position has two entries. A total of 128 locations exist, so at any one time 256 main storage page addresses are translated through or looked up in the look-aside buffer. A page address is placed in either of the two entries in its assigned position. However, a particular virtual page which is uniquely specified by an exclusive OR of selected bits of the virtual address can be placed in only one of the 128 locations of the look-aside buffer. This provides a 128 by 2-way associativity for the look-aside buffer.

Thus, only addresses corresponding to two different pages can be stored in one position of the look-aside buffer. When a third different page address which specifies the same position of the look-aside buffer is needed, one of the addresses in the look-aside buffer must be replaced. In the preferred embodiment, the first type of data is an instruction, and the second type of data is an operand. In a two operand instruction, the real addresses of both operands need to be present in the look-aside buffer to perform an operation specified by the instruction. Instruction addresses are being resolved coincident with operand addresses and at certain times, the instruction addresses will be resolved before both operand addresses are present in the look-aside buffer. When this occurs, the least recently used marker is prevented from indicating that the operand address present in the look-aside buffer is least recently used so that when the next operand address is resolved, the instruction address is removed from the look-aside buffer. This prevents a potential infinite loop of address resolutions between the two operand addresses and the instruction address which would have to be resolved by microcode. It also allows early resolution of instruction addresses because the potential infinite loop is removed which is an overall system performance improvement.

The present invention requires only a small amount of additional hardware, requires no additional microcode, and permits instruction address resolutions to occur as early as possible, solving the potential infinite loop at low cost with no loss of performance. Additionally, it increases the probability of finding as operand address in the look-aside buffer. Similarly, it increases the probability that, when a buffer location contains both an operand address and an instruction address, the instruction address will be marked least recently used. Since the address marked least recently used is compared last during a translation, the performance of operand address translations is again improved at the expense of instruction address translations. Because operand address translations, occurring for most instructions, are much more frequent than instruction address translations, occurring only when a branch is taken or the instruction stream crosses into a new page of memory, the more frequently translated type of address becomes more likely to be retained and more likely to be the first address compared during a translation, resulting in an increase in performance.

DETAILED DESCRIPTION OF THE PREFERRED EMBODIMENT

Figure 1:
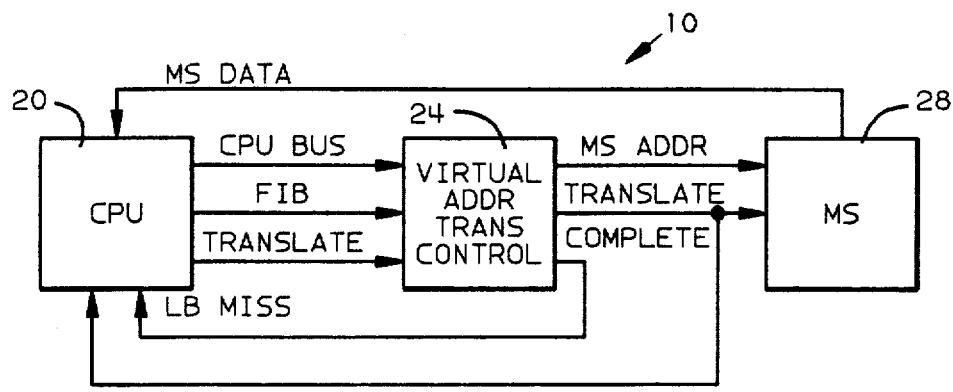
FIG. 1 is a block diagram representation of the operation of the look-aside buffer of the present invention.

A block diagram of the general operation of the present invention in relation to a computer system is shown in FIG. 1 at 10. A central processing unit (CPU) 20 executes microcode instructions. Instructions are temporarily stored in an instruction buffer within CPU 20. When the instruction buffer is empty, CPU 20 sends out a fill instruction buffer (FIB) request and a translate (TRANSLATE) request to a virtual address translator control (VAT) 24. A virtual address is provided to VAT 24 from CPU 20 on a CPU bus. The VAT 24 searches a look-aside buffer to see if it already contains a real address corresponding to a main store (MS) 28 location. If it does, then MS 28 is accessed upon provision of a translate complete signal (TRANSLATE COMPLETE) and a main store address signal (MS ADDR) and main store data (MS DATA) is provided to CPU 20 which is preferably the required instruction which is a first type of data stored in MS 28. This instruction may also contain the virtual address of the next instruction.

If the real address is not found in VAT 24, a look-aside buffer miss (LB MISS) signal is provided to the CPU 20, and the real address is resolved by a microcode routine and inserted in the look-aside buffer when the CPU 20 attempts to execute the instruction which could not be accessed.

A second type of data referred to as an operand is also stored in MS 28. The look-aside buffer stores real addresses of both types of data. Some instructions require two operands to execute. Since the instruction buffer may need filling during translation of one of the operand addresses, one of the operand real addresses used to be deleted from the look-aside buffer by the translation of the other operand address because of the intervening translation of the instruction address. An LB MISS on instruction addresses is resolved by the microcode routine at a later time after a second type of data address has been translated.

Figure 4:
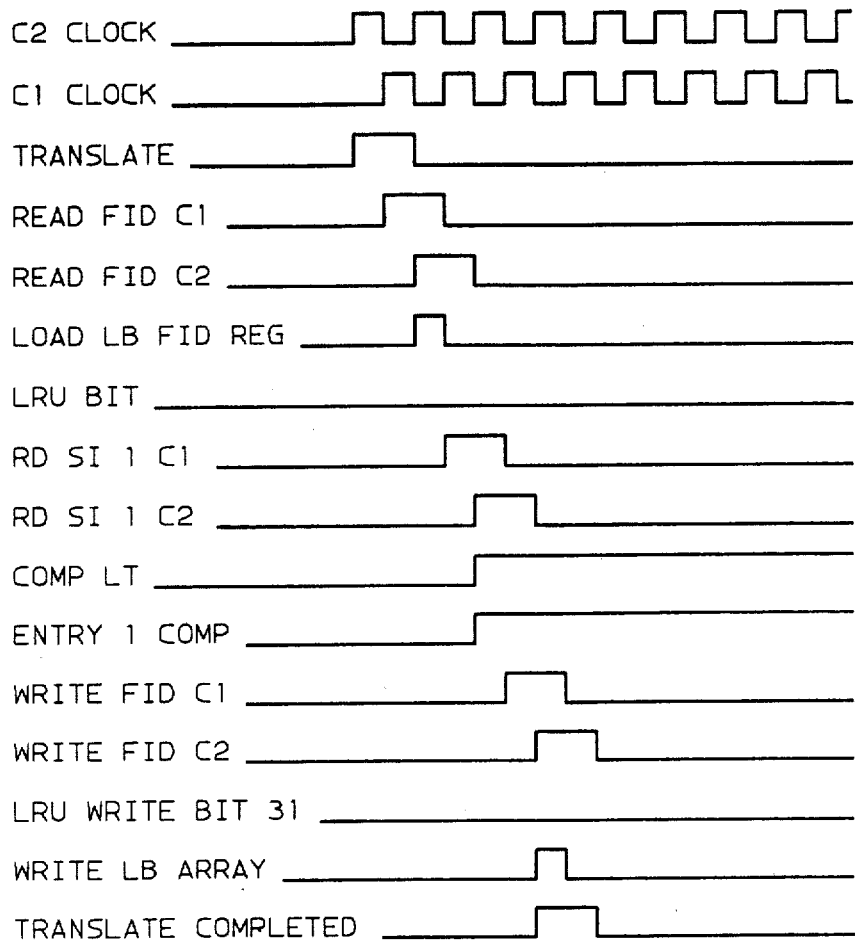
FIG. 4 is a timing diagram of the look-aside buffer of FIGS. 2a, 2b and 3 detailing timing when a second type data address is resolved.
Figure 5:
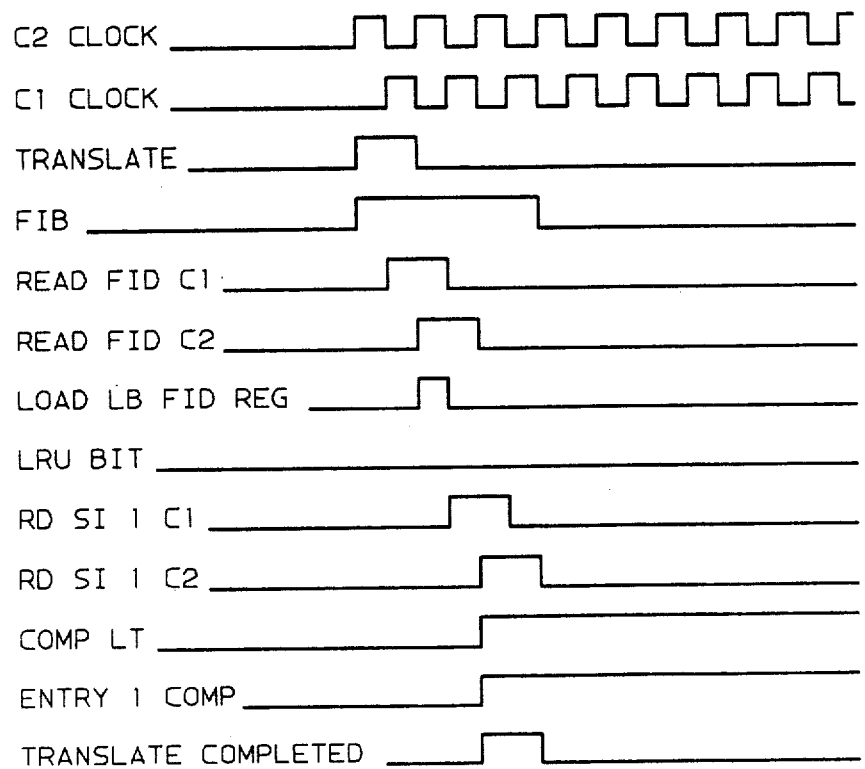
FIG. 5 is a timing diagram of the look-aside buffer of FIGS. 2a, 2b and 3 detailing timing when a first type data address is resolved.

Detailed operation of the look-aside buffer in relation with the VAT 24 is now described with reference to FIGS. 2a, 2b, 3, and timing FIGS. 4 and 5. The bottom of FIG. 2a fits with the top of FIG. 2b along the corresponding broken lines to form a composite figure. The look-aside buffer (LB) is indicated at 120 in FIG. 2a. It is arranged such that a total of 128 locations exist with 2 entries for each location, so that at any one time 256 main storage pages can be translated through LB 120. For each entry, LB 120 comprises a segment identifier (SID) and a frame identifier (FID), FID1 for the first entry and FID2 for the second entry. The FID1 entry (bits 0–14) contains the top 15 bits of a real main store address. The FID2 entry (bits 16–30) contains the top 15 bits of a different real main store address. A 32 bit SID1 is associated with each FID1 entry and a 32 bit SID2 is associated with each FID2 entry.

The LB 120 operation, prior to the improvement, for a two operand instruction at the end of a page of memory is indicated in Table 1. The two operands have virtual addresses which HASH to the same location of LB 120 as the virtual address of the next page of the instruction stream. Each time is translated operand address is not in LB 120, the current instruction will be restarted. Because of the nature of the CPU, when the instruction is restarted, it is no longer in the instruction buffer, so the instruction buffer must be assumed to be empty and the CPU must send out new FIB requests. The virtual addresses in the instruction are encountered in the order OP1 (first operand), FIB, OP2 (second operand). Because of the nature of the FIB, it will access the LB before a miss on the OP1 address can be resolved by the microcode. An LB MISS on a FIB for a subsequent instruction will be resolved by microcode after the current instruction completes and will not cause the current instruction to be restarted.

TABLE 1

| | LOOK-ASIDE BUFFER ENTRY N | | | |
|---|---|---|---|---|
| Time | LRU | REAL ADDRESS 1 | LRU | REAL ADDRESS 2 | EVENTS |
| 1 | L | — | | FIB ADDRESS | initial value; new instruction page referenced by FIB during LB MISS on OP1 |
| 2 | | OP1 ADDRESS | L | FIB ADDRESS | OP1 resolved; instruction restarted |
| 3 | L | OP1 ADDRESS | | FIB ADDRESS | OP1 referenced; new instruction page referenced by FIB |
| 4 | | OP2 ADDRESS | L | FIB ADDRESS | LB MISS on OP2; OP2 resolved; instruction restarted |
| 5 | L | OP2 ADDRESS | | FIB ADDRESS | new instruction page referenced by FIB during LB MISS on OP1 |
| 6 | | OP1 ADDRESS | L | FIB ADDRESS | OP1 resolved again (same as #2); instruction restarted |

The operation of LB 120 for the same case above, but with the improvement is indicated in Table 2.

TABLE 2

| Time | LOOK-ASIDE BUFFER ENTRY N | | | EVENTS |
|---|---|---|---|---|
| 1 | L | — | FIB ADDRESS | initial value; LB MISS on OP1 |
| 2 | OP1 ADDRESS | | L FIB ADDRESS | OP1 resolved; instruction restarted |
| 3 | OP1 ADDRESS | | L FIB ADDRESS | OP1 referenced; new instruction page referenced by FIB but the LRU flag is unchanged |
| 4 | L | OP1 ADDRESS | OP2 ADDRESS | LB MISS on OP2; OP2 resolved; instruction restarted |
| 5 | L | OP1 ADDRESS | OP2 ADDRESS | OP1 referenced; LB MISS on FIB; OP2 referenced; instruction completes |

The improvement removes the potential infinite loop of the previous method as shown in Table 1 where the OP1 address resolved at time 2 is then indicated as least recently used at time 3 due to an FIB address translation. Upon the translation of OP2, at time 4, the OPI address is lost from LB 120 because it was indicated as least recently used. At time 5, translation of the restarted FIB address changes the LRU marker to indicate OP2 address as least recently used such that at time 6, when OP1 address is resolved again, the LB 120 appears as it was at time 2. In Table 2, it is seen that at time 3, translation of an FIB address does not change the LRU marker such that at time 4, both required OP addresses are present in LB 120.

Hardware Description

Figure 2A:
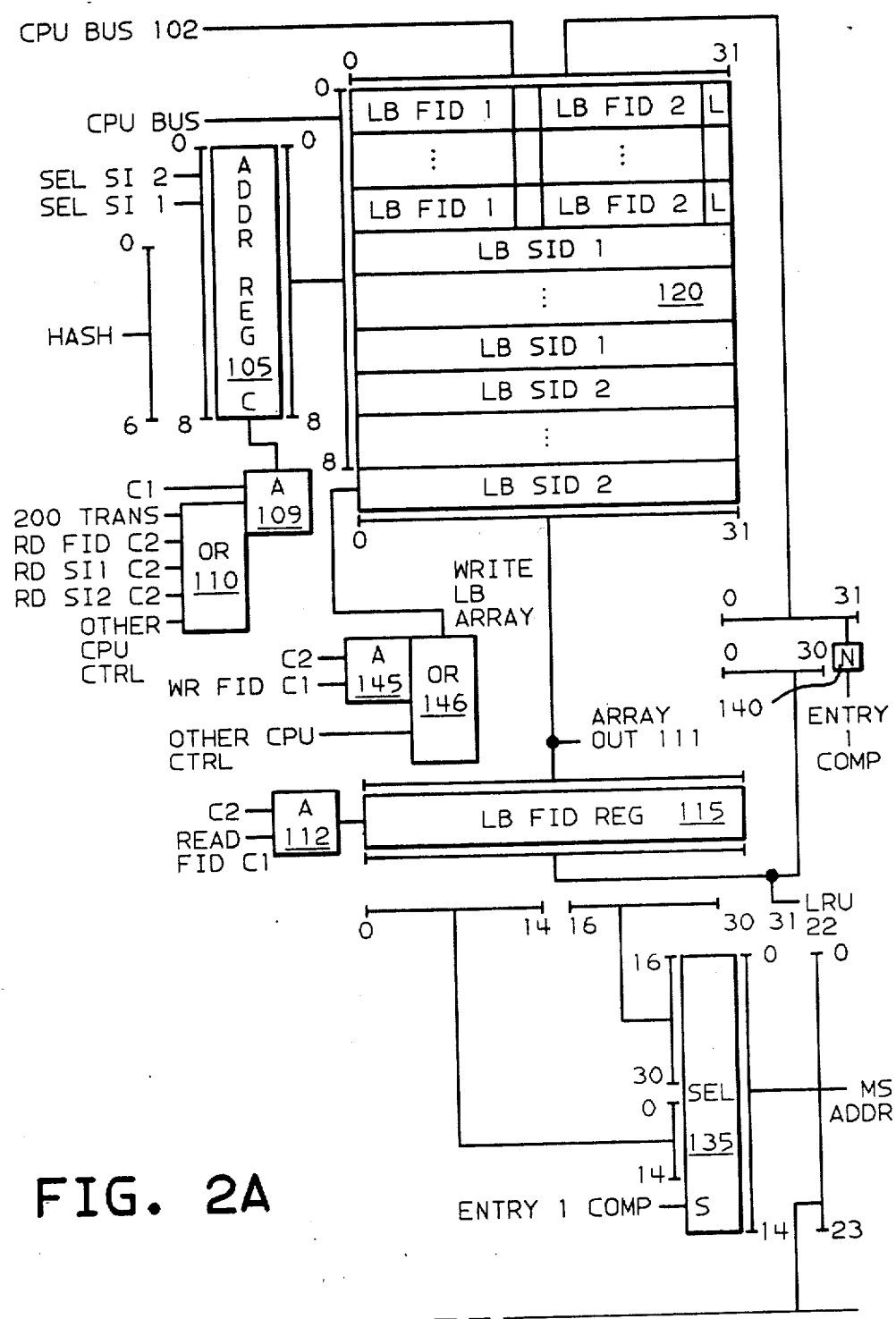
FIGS. 2a, 2b, and 3 are a detailed schematic representation of the look-aside buffer of the present invention showing logic used to control a least recently used marker.
Figure 2B:
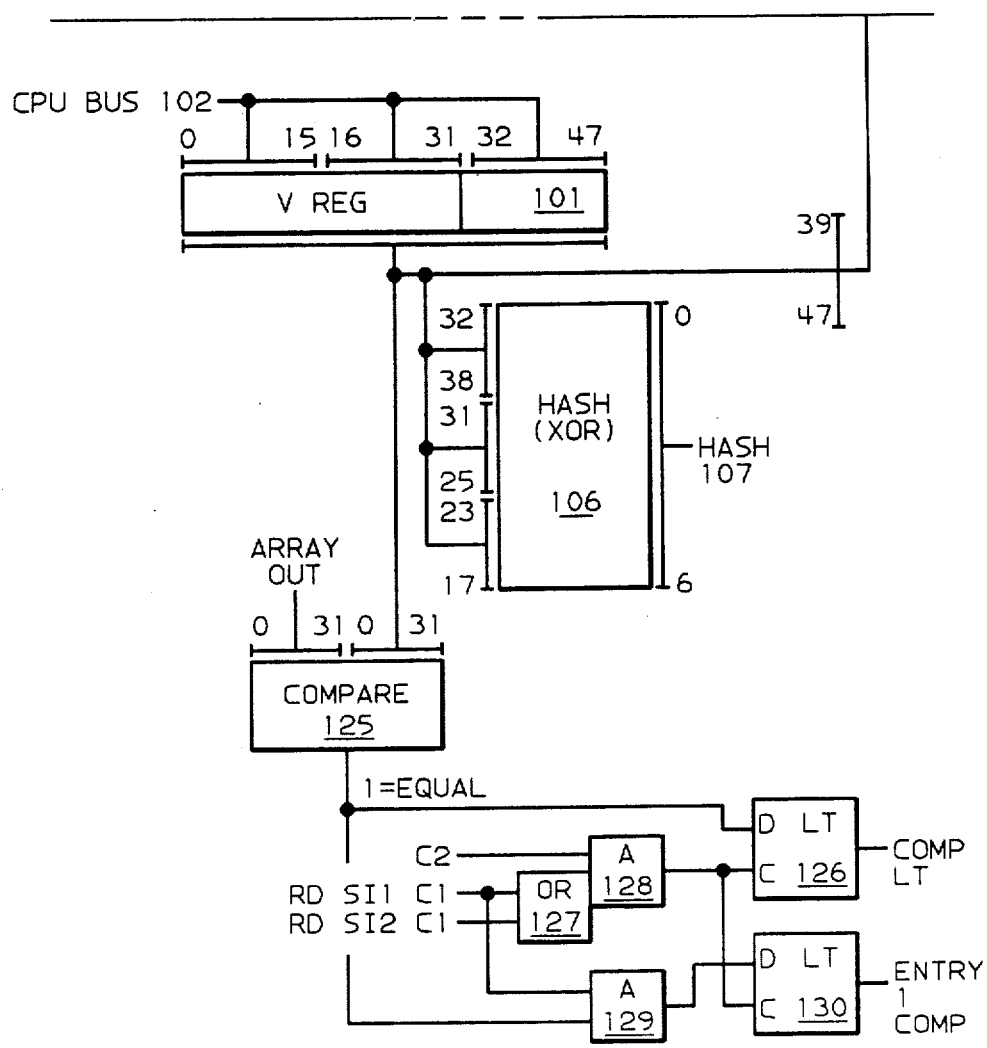

A virtual translate is initiated by the CPU activating a translate (TRANS) signal 200 in FIG. 2a and loading a 6 byte virtual address on a CPU bus 102 (FIG. 2b) into a virtual register (V REG) 101. Selected bits 39-47 of the 6 byte virtual address comprise the 9 low order bits (BID) of the desired main store address (MS ADDRESS) FIG. 2a. Other selected bits 23-17, 31-25, and 32-38 are exclusive ORed by an XOR selector 106 to form a look-aside buffer address (HASH) 107 which specifies a unique location for the virtual address in the LB 120. Several virtual addresses have the same HASH, but no virtual addresses correspond to more than one HASH or LB 120 location.

Each location in the LB 120 comprises a least recently used bit (LRU) 22 bit 31 which preferably indicates if entry 1 was least recently used with a 1 or ON, while a 0 or OFF indicates entry 2 was least recently used. LRU 22 in FIG. 3 is inverted by a NOT gate 215 with the result being ANDed by an AND gate 216 through an OR gate 217 to initiate a select SID (SEL SI) 1 signal if LRU 22 is 0. The SEL SI 1 signal is provided to a buffer address register 105 in FIG. 2a such that the most recently used entry is accessed first in LB 120. The TRANS 200 signal is provided to a pair of latches 203 and 206 which provide a RD FID C1 signal and RD FID C2 signal on consecutive C1 and C2 clock times. The RD FID C1 signal is provided to an AND gate 112 in FIG. 2a to initiate a load of an LB FID register 115 on a C2 clock. The FID register 115 receives the two FID addresses in a particular LB 120 location. The RD FID C2 signal is provided as a further input to AND gate 216 and to an AND gate 218. If LRU 22 is 1, an AND gate 220 and an OR gate 219 provide an active SEL SI 2 signal provided the real address was not found in the first entry as indicated by the RD SI 1 C2 signal which is also provided to AND gate 220. The SEL SI 2 signal is provided to a buffer address register 105 in FIG. 2 such that the least recently used entry is accessed second in LB 120. The HASH is also provided to register 105 to identify the location of the desired addresses in LB 120. In FIG. 3, the SEL SI 1 signal is provided to a pair of latches 210 and 211 to provide a RD SI 1 C1 signal on a C1 clock and a RD SI 1 C2 signal on a C2 clock.

Similarly, the SEL SI 2 signal is provided to a pair of latches 212 and 213 to provide a RD SI 2 C1 signal on a C1 clock and a RD SI 2 C2 signal on a C2 clock.

At a C1 clock time, TRANS 200 is provided through an OR gate 110 to an AND gate 109 to clock register 105 in FIG. 2a. The addressed SID entry is provided on an ARRAY OUT line 111 to a compare means 125 in FIG. 2b which compares the SID with the first 32 bits of the 6 byte address from V REG 101. A valid comparison sets a compare latch (COMP LT) 126 on a C2 clock provided either READ SID 1 C1 or READ SID 2 C1 is active as indicated by an OR gate 127 and an AND gate 128. The COMP LT signal is provided to a NOT gate 221 in FIG. 3, to an AND gate 226 and 230 and to an AND gate 247. The result of NOT gate 221 is provided to an AND gate 222, to AND gate 220 and to AND gate 243. AND gates 226 and 230 are coupled to an OR gate 227 which in turn is coupled to a pair of latches 228 and 229 which provide a WR FID C1 and a WR FID C2 signal on successive C1 and C2 clocks. The WR FID C1 signal is provided to an AND gate 145 in FIG. 2a and through an OR gate 146 on a C2 clock to cause the FID address in the LB FID register 115 to be written back into the LB 120. The LRU bit is part of the address written back into the LB 120, and is provided by a NOT gate 140 responsive to an ENTRY 1 COMP signal. The ENTRY 1 COMP signal is provided by a latch 130 at a C2 clock provided the virtual addresses compare and the signal RD SI 1 C1 is active as indicated by an AND gate 129.

Figure 3:
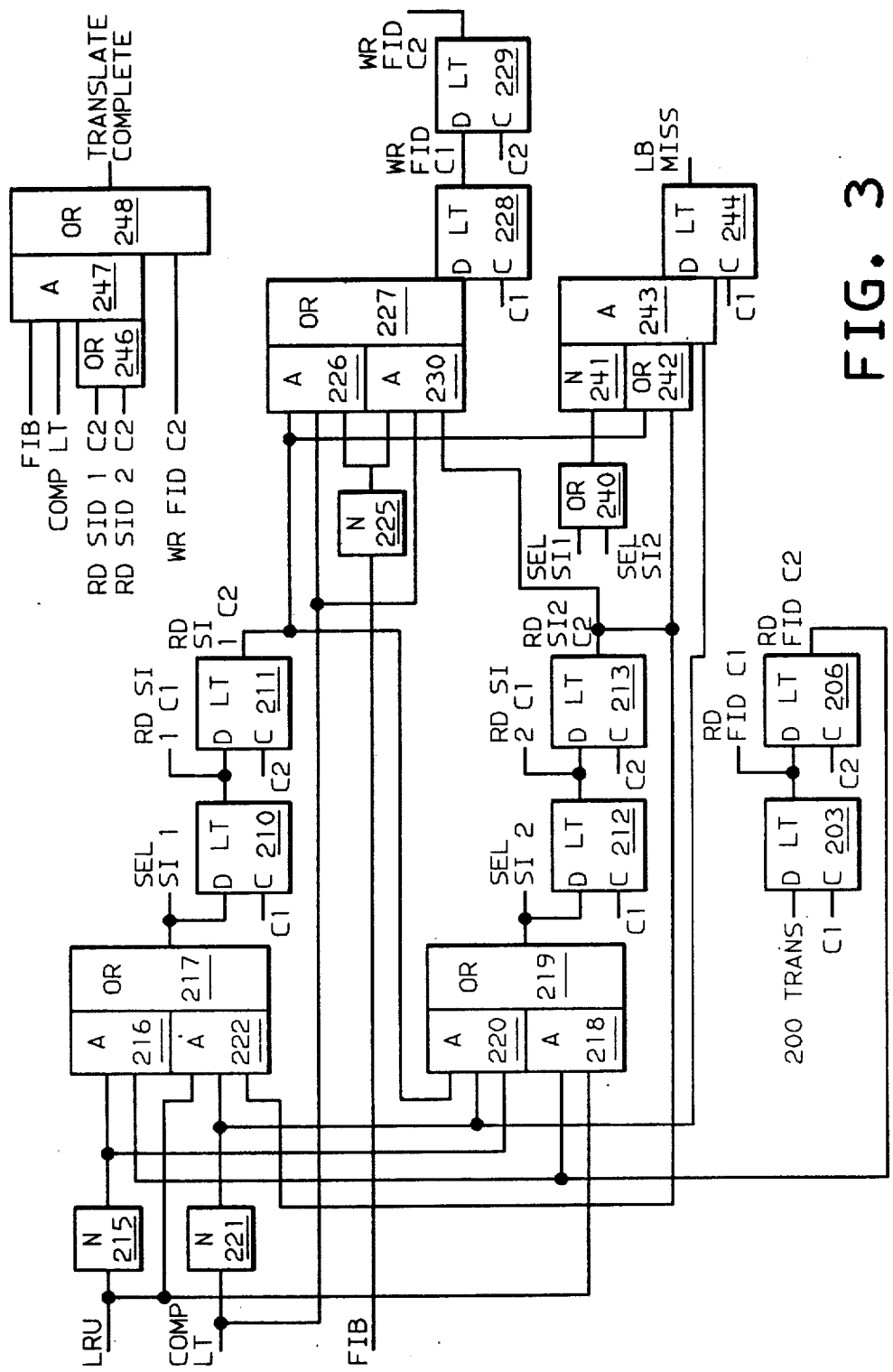

In FIG. 3, the SEL SI 1 and SEL SI 2 signals are ORed by an OR gate 240, which result is inverted by a NOT gate 241 and ANDed by an AND gate 243 with the OR of the RD SI 2 C2 and RD SI 1 C2 signals provided by an OR gate 242 and NOT gate 221 to indicate an LB MISS. The LB MISS signal is provided at a C1 clock time by a latch 244 and indicates to the CPU that neither entry in the LB 120 contained the required real address. If one of the entries did contain the required address, the WR FID C2 signal is provided to OR gate 248 to provide a TRANSLATE COMPLETE signal which would be provided to both the CPU and the main store to indicate that the real address is available from the FID register 115. Since the FID register 115 contains two addresses, a selector 135 selects the correct address as a function of the ENTRY 1 COMP signal provided by latch 130. The selected address is combined with bits 39 through 47 of the 6 byte virtual address to provide a complete real address to the main store.

In the event of a first type of data, or instruction fetch, an FIB signal is active. In FIG. 3, the FIB signal is inverted by a NOT gate 225 comprising a marker control means, which result is provided to AND gates 226 and 230 to prevent the WR FID C1 and WR FID C2 signals from being activated. This prevents a write of the contents of the FID register 115 back into the LB 120 and thus prevents a change in the LRU bit by NOT gate 140. To provide the TRANSLATE COMPLETE signal since the WR FID C2 signal is no longer active, the FIB signal is ANDed by an AND gate 247 with the COMP LT signal and the OR of the RD SI 1 C2 and RD SI 2 C2 signals by an OR gate 246. This result is provided to OR gate 248 to provide the TRANSLATE COMPLETE signal.

Hardware Timing

When a virtual address translate is to be done, the 6 byte virtual address is loaded into the V REG 101 by means of the CPU BUS 102. The TRANS 200 signal becomes active as shown in FIG. 4 from a C2 clock time to the next C2 clock time. When the TRANS 200 signal becomes active, the LB 120, ADDR REG 105 is loaded with the HASH consisting of the exclusive OR of V REG 101 bits 32 to 38 with V REG 101 bits 31 to 25 and V REG 101 bits 23 to 17. The ADDR REG 105 is loaded with the HASH at a C1 clock time by means of AND gate 109 and OR gate 110. Since SEL SI 1 and SEL SI 2 signals are not yet active, one of the first 128 locations of the LB 120 will be addressed by ADDR REG 105. At the same C1 clock time as the ADDR REG 105 is loaded, the READ FID C1 latch 203 is set.

At the next C2 clock time, the LB FID REG 115 is loaded with the contents of the LB 120 addressed by ADDR REG 105. The LB FID REG 115 is loaded by means of AND gate 112. Bits 0–14 of the LB FID REG 115 contain the top 15 main store address bits of the first LB entry. Bits 16–30 of the LB FID REG 115 contain the top 15 main store address bits of the second LB entry. Bit 31 of the LB FID REG 115 is called the LRU (least recently used) bit. The purpose of this bit is to keep track of which entry compared to the last translated virtual address specifying this LB location. If this bit is a 0 then the LB SID 1 entry located in the LB 120 between the address range of 128 to 225 was the last entry referenced by the HASH in which the virtual address to be translated compared. If this bit is a 1 then the LB SID 2 entry located between locations 256 and 383 in the LB 120 was the last entry which compared with the last virtual address translated.

At the next C1 clock time, either the RD SI 1 C1 latch 210 or the RD SI 2 C1 latch 212 will be set depending on the LRU 22. If the LRU 22 bit is a 0 then the RD SI 1 C1 latch will be set by means of NOT gate 215, AND gate 216 and OR gate 217 indicating that the last time this LB entry was used in a translation, LB SID 1 entry compared. If the LRU 22 bit is a 1 then the RD SI 2 C1 latch 212 will be set by means of AND gate 218 ad OR gate 219 indicating that the last time this LB entry was used in a translation, LB SID 2 entry compared. At the same C1 clock time, the ADDR REG 105 is loaded again with the HASH and with either bit 0 or bit 1 forced ON depending on the value of the LRU 22 bit by means of the SEL SI 1 or SEL SI 2 signals. Also at this time, the READ LB FID C1 latch 203 is reset.

At the next C2 clock time, either the RD SI 1 C2 latch 211 will be set if the RD SI 1 C1 latch 210 is set or the RD SI 2 C2 latch 213 will be set if the RD SI 2 C1 latch 212 is set. At the same C2 clock time, a compare is made between the 4 byte SID of the virtual address being translated in the V REG 101 (bits 0–31) with the 4 byte LB SID being read from the LB 120 (either the LB SID 1 entry or the LB SID 2 entry) by means of the COMPARE logic 125. If the compare is equal, the COMP LT latch 126 is set by means of OR gate 127 and AND gate 128. In addition if the compare is equal and the RD SI 1 C1 latch 210 is set, then the ENTRY 1 COMP latch 130 will be set by means of AND gates 128 and 129 and OR gate 127, indicating the compare occurred on LB SID 1 entry. The READ FID C2 latch 206 is reset at this time. If the FIB signal is active and the COMP LT latch 126 is set then the TRANSLATE COMPLETE signal will become active by means of OR gates 246 and 248 and AND gate 247.

At the next C1 clock, if the SID entry that was read did not compare, then the SID entry not read previously will be read and compared. If RD SI 1 C2 latch 211 is set then RD SI 1 C1 latch 210 will be reset and RD SI 2 C1 latch 212 will be set by means of NOT gate 221, AND gate 220 and OR gate 219. If RD SI 2 C2 latch 213 is set, then RD SI 2 C1 latch 212 is reset and RD SI 1 C1 latch 210 will be set by means of NOT gate 221, AND gate 222 and OR gate 217.

At the next C2 clock time (provided the first SID entry read did not compare), either the RD SI 1 C2 latch 211 will be set if the RD SI 1 C1 latch 210 is set or the RD SI 2 C2 latch 213 will be set if the RD SI 2 C1 latch 212 is set. At the same C2 clock time, a compare is made between the 4 byte SID of the virtual address being translated in the V REG 101 (bits 0–31) with the 4 byte LB SID being read from the LB 120 (either the LB SID 1 entry or the LB SID 2 entry) by means of the COMPARE logic 125. If the compare is equal, the COMP LT latch 126 is set by means of OR gate 127 and AND gate 128. In addition if the compare is equal and the RD SI 1 C1 latch 210 is set, then the ENTRY 1 COMP latch will be set by means of AND gates 128 and 129 and OR gate 127, indicating the compare occurred on LB SID 1 entry. If the FIB signal is active and the COMP LT latch 126 is set then the TRANSLATE COMPLETE signal will become active by means of OR gates 246 and 248 and AND gate 247.

If the COMP LT latch 126 is set by either of the LB SID 1 or 2 compares and the FIB signal is not active, then at the next C1 clock time, the RD SI 1 C1 latch 210 and the RD SI 2 C1 latch 212 will be reset. At the same time the WR LB FID latch 228 will be set by means of AND gate 226 and OR gate 227 if the compare occurred when the LB SID 1 was read or by means of AND gate 230 and OR gate 227 if the compare occurred when the LB SID 2 was read. NOT gate 225 prevents the LB FID from being written if a FIB is being translated and thus prevents the LRU 22 bit in the LB 120 location from being altered.

If the FIB signal is not active and the COMP LT latch 126 is set, then at the next C2 clock time, the RD SI 1 C2 latch 211 and the RD SI 2 C2 latch 213 will be reset. At the same time, the WR FID C2 latch 229 will be set if the WR FID C1 latch 228 is set. Since the WR FID C1 latch 228 is set (because no FIB translate is taking place), the LB FID REG 115 bits 0–30 concatenated with the new LRU bit generated by NOT gate 140 is written into the FID entries of the LB 120 location addressed by the HASH by means of AND gate 145 and OR gate 146. The TRANSLATE COMPLETE signal becomes active at this time by means of OR gate 248.

The main store address is valid to the main store control logic after the SID compare is complete until after the TRANSLATE COMPLETE signal becomes active by means by SELECTOR 135 concatenated with V REG 101 bits 39 to 47. The SELECTOR 135 gates the LB FID REG 115 bits 0–14 to the top main store address bits when the ENTRY 1 COMP latch 130 is set; otherwise if the ENTRY 1 COMP latch 130 is reset, then the LB FID REG 115 bits 16–30 are gated to the top main store address bits.

If neither LB SID entries compared with the first 4 bytes of the virtual address in V REG 101, then at the C1 clock time after the second LB SID compare, the LB MISS latch 244 will be set by means of OR gates 240 and 242, NOT gates 241 and 221 and AND gate 243.

Operation Given Specific Conditions

Condition 1: An operand translate is initiated by the CPU, the LRU bit is OFF and the LB 120 SID 2 entry referenced by the HASH compares with the first 4 bytes of the virtual address in the register 101. Since the LRU bit is off, the SID 1 entry is read first when the RD SI 1 C1 signal is active. Since the SID 1 entry does not compare, the SID 2 entry is read when the RD SI 2 C1 signal is active. Because the SID 2 entry being read compares with the SID in the first 4 bytes of the register 101, the COMP LT signal is on and the ENTRY 1 COMP signal is reset. Since a compare occurred, the LB 120 location is re-written with the LRU bit ON when the WR LB FID C1 signal is active, indicating that the SID 2 entry compared last. The main store address, formed by concatenating FID REG 115 bits 16–30 with the register 101 bits 39–47, is gated to the main store during the writing of the LB 120 location. A TRANSLATE COMPLETE signal is then generated indicating the translate is finished.

Condition 2: FIG. 4. An operand translate is initiated by the CPU, the LRU bit is OFF and the LB 120 SID 1 entry referenced by the HASH compares with the first 4 bytes of the virtual address in the register 101. Since the LRU bit is OFF, the SID 1 entry is read first when the RD SI 1 C1 signal is active. Because the SID 1 entry being read compares with the SID in the first 4 bytes of the register 101, the COMP LT signal and the ENTRY 1 COMP signal are active. Since a compare occurred, the LB 120 location is re-written with the LRU bit OFF when the WR LB FID C1 signal is active, indicating that the LB SID 1 entry compared last. The main store address, formed by concatenating the first 14 bits of the LB FID register 115 with the V register 101 bits 39–47, is gated to the main store during the writing of the LB 120 location. A TRANSLATE COMPLETE signal is then generated indicating the translate is finished.

Condition 3: FIG. 5. An instruction translate is initiated by the CPU, the LRU bit is OFF and the LB 120 SID 1 entry referenced by the HASH compares with the first 4 bytes of the virtual address in the register 101. Because an instruction translate is being done, the FIB signal will be active until the TRANSLATE COMPLETE or LB MISS signals become active. Since the LRU bit is OFF, the SID 1 entry is read first when the RD SI 1 C1 signal is active. Because the SID 1 entry being read compares with the SID in the first 4 bytes of the V register 101, the COMP LT signal is active, and the ENTRY 1 COMP signal is active. Because the FIB signal is active, the FID register 115 is not written to LB 120. Instead, the TRANSLATE COMPLETE signal becomes active. Thus the LRU bit in the Lb 120 location is not altered during the FIB translate. The main store address, formed by concatenating the first 14 bits of the FID register 115 with V register 101 bits 39–47, is gated to the main store when the TRANSLATE COMPLETE signal becomes active indicating the translate is finished.

What is claimed is:

1. An improved look-aside buffer in a computer system which has a memory having at least a first type of data and a second type of data stored in a page format, the look-aside buffer being arranged to retain in a selected location at least two real addresses which have been resolved by the system, of pages containing the different types of data, one of said page addresses being indicated as least recently used by a marker and therefore deleted when a further address is resolved by the system, wherein the buffer is accessed by the system with a virtual address to look up the real address, the improvement comprising:
    data type detection means to detect buffer accesses by the system which occur corresponding to the first type of data; and
    marker control means coupled to the data type detection means to prevent the least recently used marker from indicating that an address corresponding to the second type of data was least recently used when a first type of real data address is accessed in the buffer by the system such that second type data page addresses are not deleted from the look-aside buffer as a result of resolving a first type data page address.

2. The look-aside buffer of claim 1 wherein each page of data stored in the memory has an associated virtual address which indicates one look-aside buffer location.

3. The look-aside buffer of claim 2 wherein several virtual addresses associated with different pages of memory indicate the same look-aside buffer location.

4. A look-aside buffer apparatus in a computer system which has a memory having at least a first type of data and a second type of data stored in a page format, the computer system providing a virtual address which must be translated to provide a real address to access the memory, the apparatus comprising:
    buffer means, arranged to retain in a location at least two real addresses of memory pages as previously resolved by the system, for receiving and translating virtual addresses, each virtual address identifying a corresponding real address;
    a least recently used marker for indicating which of the addresses in the buffer means was least recently used;
    data type detection means for detecting buffer translations of virtual addresses corresponding to the first type of data; and
    marker control means coupled to the data type detection means for preventing the least recently used marker from indicating that an address corresponding to the second type of data was least recently used when a first type of data address is translated by the buffer means such that second type data page addresses are not removed from the buffer means as a result of the computer system resolving a first type data page address.

5. The apparatus of claim 4 wherein the first type of data comprises instructions for execution by the computer system.

6. The apparatus of claim 5 wherein the second type of data comprises data for use in execution of instructions.

7. The look-aside buffer of claim 6 wherein certain instructions require two real addresses of the second type of data in a single look-aside buffer location.

8. The apparatus of claim 7 wherein the marker control means does not change the least recently used marker upon the occurance of an instruction address translation made by said buffer means.

9. The apparatus of claim 5 wherein the buffer means further comprises at least a first and a second virtual address of memory pages in each location identifying at least a first and a second real address of memory pages respectively.

10. The apparatus of claim 9 and further comprising compare means coupled to the buffer means for first comparing the virtual address provided by the computer system with one of the first and second virtual addresses in the location specified by the virtual address provided by the computer system and then comparing the virtual address provided by the computer system with the other of the first and second virtual addresses in the location specified by the virtual address provided by the computer system.

11. The apparatus of claim 10 wherein the least recently used marker determines which of the first and second virtual addresses in the buffer means is first compared with the virtual address provided by the computer system.

12. The apparatus of claim 9 wherein the least recently used marker for each location is stored in the buffer means at each location.

13. The apparatus of claim 12 wherein the least recently used marker for each location is stored with the first and second real addresses.

14. The apparatus of claim 13 and further comprising writing means coupled to the buffer means and to the marker control means for writing the first and second real addresses and the least recently used marker back to the buffer means location indicated by the virtual address provided by the computer system responsive to the marker control means.

15. The apparatus of claim 14 wherein the marker control means provides a first type data translation signal to the writing means to prevent the writing means fron writing the least recently used marker back to the buffer means location such that the least recently used marker is not changed in response to a first type data address translation by the buffer means.

* * * * *